(12) United States Patent
Tanio et al.

(10) Patent No.: US 6,619,163 B2
(45) Date of Patent: Sep. 16, 2003

(54) METHOD AND DEVICE FOR CUTTING BRAKING SURFACES OF A BRAKE ROTOR

(75) Inventors: Masayuki Tanio, Shizuoka (JP); Hirohiko Nishio, Shizuoka (JP)

(73) Assignee: NTN Corporation, Osaka (JP)

( * ) Notice: Subject to any disclaimer, the term of this patent is extended or adjusted under 35 U.S.C. 154(b) by 136 days.

(21) Appl. No.: 09/798,953

(22) Filed: Mar. 6, 2001

(65) Prior Publication Data

US 2001/0020321 A1 Sep. 13, 2001

(30) Foreign Application Priority Data

Mar. 10, 2000 (JP) ........................................ 2000-067066

(51) Int. Cl.[7] ................................................ B23B 5/04
(52) U.S. Cl. ........................................... 82/112; 82/158
(58) Field of Search ........................... 82/112, 1.1, 158, 82/162, 104, 123, 50, 52

(56) References Cited

U.S. PATENT DOCUMENTS

| | | | | |
|---|---|---|---|---|
| 4,765,016 A | * | 8/1988 | Iwata | ........................... 15/246 |
| 5,480,007 A | | 1/1996 | Hartford | |
| 5,842,388 A | | 12/1998 | Visser et al. | |
| 5,899,305 A | * | 5/1999 | Austin et al. | ......... 188/218 XL |
| 5,915,502 A | * | 6/1999 | Rapisardi et al. | ......... 188/18 R |
| 5,937,499 A | * | 8/1999 | Austin et al. | .................. 29/434 |
| 6,158,124 A | * | 12/2000 | Austin | ...................... 29/898.09 |
| 6,247,219 B1 | * | 6/2001 | Austin et al. | .................. 29/434 |

FOREIGN PATENT DOCUMENTS

| | | | | |
|---|---|---|---|---|
| GB | 2090781 A | * | 7/1982 | ............. B23B/5/04 |
| JP | 11-019803 | | 1/1999 | |
| JP | 2000-5969 A | * | 1/2000 | |

* cited by examiner

*Primary Examiner*—Henry W. H. Tsai
(74) *Attorney, Agent, or Firm*—Wenderoth, Lind & Ponack, L.L.P.

(57) ABSTRACT

A cutting method which can efficiently cut braking surfaces of a brake rotor of a wheel bearing assembly. A reference surface on one side of a vehicle body-mounting flange provided on an outer member of the wheel bearing assembly is brought into abutment with positioning pieces of a positioning member, and a cylindrical outer peripheral surface of the outer member is clamped by a chuck device. By advancing pushrods of first and second pressing devices, a raceway member and a hub ring forming the inner member are pressed axially to put the assembly into an actual mounted state. The inner member and the brake rotor are rotated by rotating the pushrod of the second pressing device, and a cutting tool is moved in a direction parallel to the reference surface to cut the braking surfaces of the brake rotor.

20 Claims, 5 Drawing Sheets

METHOD AND DEVICE FOR CUTTING BRAKING SURFACES OF A BRAKE ROTOR

BACKGROUND OF THE INVENTION

This invention relates to a method and a device for cutting braking surfaces of a brake rotor mounted on a wheel-mounting flange of a wheel bearing assembly.

Figure 3:
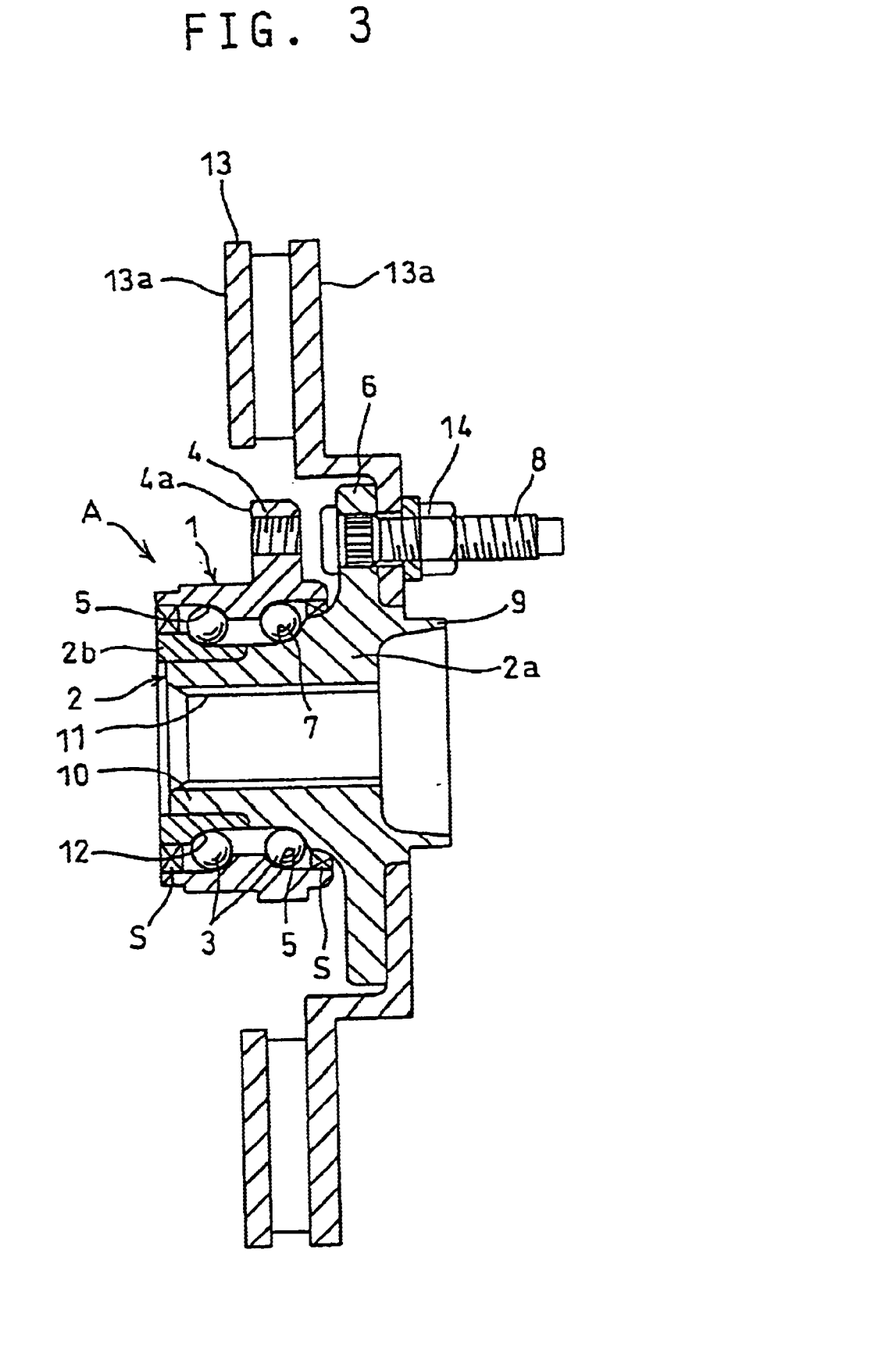
FIG. 3 is a vertical sectional front view showing one example of a wheel bearing assembly with a brake rotor.

Among wheel bearing assemblies, there are ones for driving wheels and ones for non-driving wheels. FIG. 3 shows one example. This wheel bearing assembly is for a driving wheel, and comprises an outer member 1, an inner member 2 and double-row rolling elements 3 mounted between the outer and inner members 1 and 2.

A vehicle body-mounting flange 4 is formed on outer periphery of the outer member 1, and double-row raceways 5 are formed on an inner periphery of the outer member.

The inner member 2 comprises a hub ring 2a as a first rotary member and a raceway member 2b as a second rotary member. On an outer periphery of the hub ring 2a, a wheel-mounting flange 6 and a raceway 7, opposing one of raceways 5 formed on the outer member 1, are formed. Hub bolts 8 are provided on the wheel-mounting flange 6. A wheel pilot 9 is formed at one end of the hub ring 2a, while a small-diameter portion 10 is provided at another end of the hub ring. A spline hole 11 extends through the hub ring 2a from its small-diameter portion 10 to a bottom of the wheel pilot 9.

The raceway member 2b is fitted on the small-diameter portion 10 of the hub ring 2a, and is formed on its outer periphery with a raceway 12 opposing the other of the double-row raceways 5 formed on the outer member 1.

The double-row rolling elements 3 are mounted between the double-row raceways 5 formed on the inner periphery of the outer member 1 and the raceways 7 and 12 formed on the hub ring 2a and the raceway member 2b, respectively, to support the inner member 2 rotatably relative to the outer member 1. Also, seals S are mounted at both ends of a space between opposing surfaces of the outer member 1 and the inner member 2 to prevent entry of dust into the space.

With the wheel bearing assembly having the above structure, in mounting to a vehicle, the vehicle body-mounting flange 4 formed on the outer member 1 is mounted to a vehicle body by tightening bolts.

Also, a spline shaft provided on an outer joint member of a constant-velocity joint is inserted into the spline hole 11 formed in the hub ring 2a, a nut is brought into threaded engagement with a threaded shaft formed at a tip of the spline shaft, and the nut is tightened with a predetermined torque to press the hub ring 2a and the raceway member 2b against each other so as to impart a preload between the rolling elements and the raceways 5, 7 and 12.

Further, wheel nuts 14 are threaded onto the hub bolts 8 provided on the wheel-mounting flange 6, and these nuts are tightened to mount a brake rotor 13 and vehicle wheel to the wheel-mounting flange 6.

With such a wheel bearing assembly, because run-out of a braking surface 13a during rotation of the brake rotor 13 can be a cause of brake-judder during braking, high machining accuracy and high dimensional accuracy are required for parts of the wheel bearing assembly.

But even if machining accuracy of each part is increased, because machining errors of respective parts accumulate during assembly of the wheel bearing assembly, and also because assembling errors develop, it is impossible to suppress run-out of the braking surface 13a of the brake rotor 13.

In order to solve this problem, a cutting method has already been proposed in which a wheel bearing assembly is assembled so as to be actually mountable, and a wheel bearing assembly with a brake rotor mounted to a wheel-mounting flange 6 provided on inner member 2 is mounted on a cutting machine, and braking surface 13a of brake rotor 13 is cut while rotating the inner member 2 and the brake rotor 13 (Japanese patent publication 11-19803).

According to this cutting method, since the braking surface 13a of the brake rotor 13 is cut with the wheel bearing assembly, with the brake rotor, in an actually mounted state, accumulated errors in which machining errors of respective parts accumulate, and strains produced in mounting the brake rotor 13 are removed. Thus, by mounting the wheel bearing assembly with the brake rotor thus cut on an actual vehicle, the wheel bearing assembly is restored to a state at the end of cutting, so that run-out of the braking surface 13a during rotation of the brake rotor 13 is extremely small. Thus, it is possible to rotate the brake rotor 13 with extremely high accuracy.

In the above method, in which the braking surfaces 13a of the brake rotor 13 are cut in an actual mounted state, a spline shaft provided at a tip of a drive shaft is inserted into a spline hole 11 formed in the inner member 2, a preload nut is threaded onto a threaded shaft provided at a tip of the spline shaft, and the pre-load nut is tightened to make the wheel bearing assembly be in an actual mounted state. Thus, attaching and detaching the wheel bearing assembly with the brake rotor are extremely troublesome, and it takes a long time to perform cutting.

An object of this invention is to provide a method for cutting braking surfaces of a brake rotor of a wheel bearing assembly which makes it possible to efficiently cut braking surfaces of the brake rotor in a short time by making it possible to easily put the wheel bearing assembly in an actual mounted state. Another object of the invention is to provide a device for practicing the method.

SUMMARY OF THE INVENTION

According to this invention, there is provided a method of cutting braking surfaces of a brake rotor of a wheel bearing assembly. The wheel bearing assembly comprises an outer member having a vehicle body-mounting flange on its outer periphery, an inner member having a wheel-mounting flange on its outer periphery, rolling elements disposed between the outer member and the inner member for rotatably supporting the inner member, and the brake rotor which is mounted to the wheel-mounting flange of the inner member. The method comprises the steps of assembling the wheel bearing assembly with the brake rotor in an actual mounted state, determining a mounting surface of the vehicle body-mounting flange to be mounted on a vehicle body as a reference surface, non-rotatably supporting the outer member positioned against the reference surface, clamping the inner member with a pair of oppositely arranged pressing members from both ends thereof with a pressing force corresponding to a clamping force in the actual mounted state, rotating the inner member and the brake rotor while maintaining a clamped state, and cutting the braking surfaces of the brake rotor by moving a cutting tool in a direction parallel to the reference surface.

With this arrangement, since the wheel bearing assembly with the brake rotor can be brought into an actual mounted state by non-rotatably supporting the outer member while positioning it against the reference surface on the vehicle body-mounting flange formed on the outer member, and pressing the inner member with a pair of pressing devices from both axial ends of the inner member, it is possible to efficiently perform cutting of the braking surfaces of the brake rotor.

By performing dry-cutting, with no cutting liquid, for cutting the braking surfaces by the cutting tool, and cutting the braking surfaces of the brake rotor while supplying compressed air from one end of the outer member so that the compressed air flows along an outer periphery of the outer member, it is possible to prevent chips produced by cutting from adhering to seals of the wheel bearing assembly and thus avoid damage to the seals.

Also, by performing cutting of the braking surfaces while sucking chips, it is possible to reliably prevent chips from adhering to the seals of the wheel bearing assembly and thus avoid damage to the seals, and also to prevent scattering of chips to a surrounding environment.

According to this invention, there is also provided a cutting device for cutting braking surfaces of a brake rotor mounted on a wheel bearing assembly. The wheel bearing assembly comprises an outer member having a vehicle body-mounting flange on its outer periphery. The vehicle body-mounting flange has a mounting surface to be mounted to a vehicle body, which mounting surface is to be used as a reference surface. The wheel bearing assembly also comprises an inner member having a wheel-mounting flange on its outer periphery, and rolling elements disposed between the outer member and the inner member. The cutting device comprises a positioning member for positioning the reference surface on the vehicle body-mounting flange of the outer member, a chuck device for clamping the outer member, a pair of pressing devices for pressing and clamping the inner member from both ends thereof with a pressing force corresponding to a clamping force in an actual mounted state, a rotary device for rotating the inner member, and a tool rest carrying a cutting tool for cutting braking surfaces of a brake rotor and mounted so as to be movable in a direction.parallel to the reference surface on the vehicle body-mounting flange of the outer member.

With this arrangement, by clamping the outer member with the chuck device with the reference surface of the vehicle body-mounting flange provided on the outer member in abutment with a positioning member, and pressing the inner member with a pair of pressing devices from both sides thereof, it is possible to put the wheel bearing assembly with the brake rotor in an actual mounted state. And, by rotating the inner member via a rotary device and radially inwardly moving the tool rest from an outer periphery of the brake rotor, it is possible to cut the braking surfaces of the brake rotor.

Since a cutting tool comprises a pair of tool holders each carrying a cutter for cutting the braking surfaces, by fixing one of the tool holders relative to the cutter rest while supporting the other tool holder so as to be openable and closable relative to the one tool holder, a distance between the cutters can be adjusted. Thus, it is possible to arbitrarily adjust an amount of cut into the braking surfaces of the brake rotor. Also, because after cutting of the braking surfaces, the cutting tool can be returned to an original position at a start of machining with the other tool holder open relative to the one tool holder, it is possible to prevent damage to the braking surfaces of the brake rotor subjected to cutting.

By providing the cutting device according to this invention with an air supply device for supplying compressed air from one end of the outer member along its outer periphery, or a suction device for sucking and removing chips formed by cutting, it is possible to solve a problem in which cutting powder or chips adhere to the seals of the wheel bearing assembly and imparts damage to the seals.

Other features and objects of the present invention will become apparent from the following description made with reference to the accompanying drawings, in which:

DETAILED DESCRIPTION OF THE PREFERRED EMBODIMENTS

Hereinbelow, an embodiment of this invention will be described with reference to the drawings.

Figure 1:
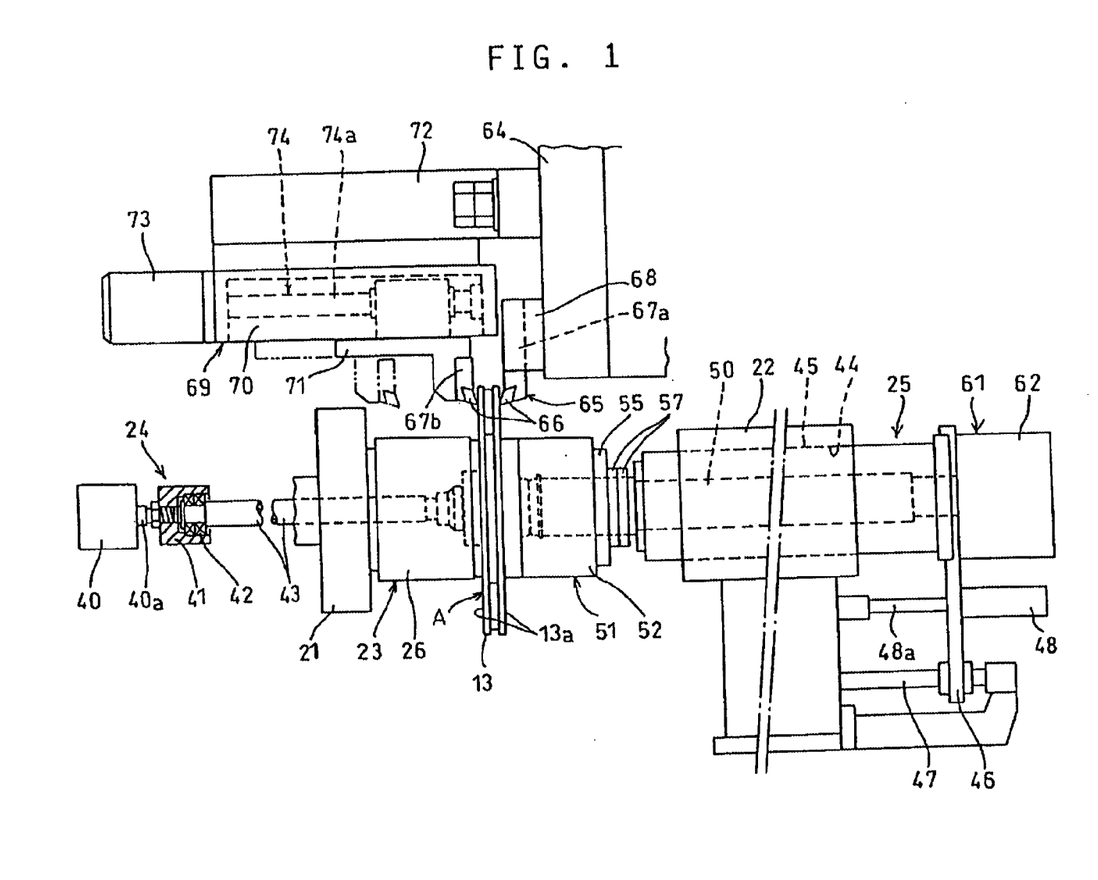
FIG. 1 is a plan view showing an embodiment of a cutting device according to this invention.

As shown in FIG. 1, a cutting device embodying the present invention has a first support member 21 and a second support member 22 arranged opposite to the first support member 21.

On a side of the first support member 21, a chuck device 23 for clamping an outer member 1 of a wheel bearing assembly A to a brake rotor shown in FIG. 3, and a first pressing device 24 for axially pressing a raceway member 2b of an inner member 2, are provided.

On a side of the second support member 22, a second pressing device 25 for axially pressing a hub ring 2a of the inner member 2 of the wheel bearing assembly A is provided.

Figure 2:
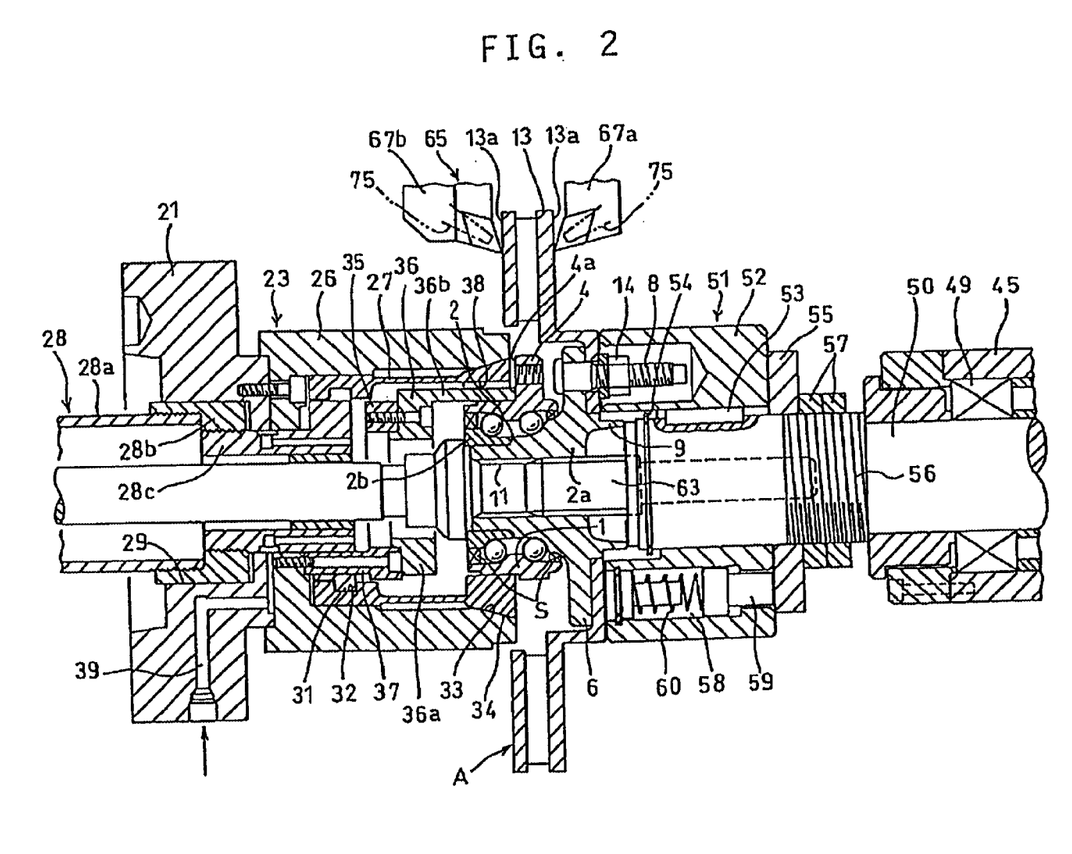
FIG. 2 is a partially enlarged sectional plan view of the cutting device of FIG. 1.

As shown in FIG. 2, the chuck device 23 comprises a tubular collet holder 26 having its rear end supported on the first support member 21, a spring collet 27 mounted in the collet holder 26, and a drawbar 28 for axially moving the spring collet 27.

The drawbar 28 has a connecting shaft 28c coupled to a tip of a tubular member 28a through a connecting tube 28b, which is slidably inserted in a guide hole 29 formed in the first support member 21.

A protrusion 31 is formed on an outer periphery of the connecting shaft 28c at its tip. The protrusion 31 engages an annular groove 32 formed in an inner peripheral surface of the spring collet 27 at its rear end.

With this chuck device 23, the spring collet 27 is moved back and forth by axial movement of the drawbar 28. During retraction of the spring collet 27, a tapered surface 33, formed on an inner surface of the collet holder 26 at its tip, and a tapered surface 34, formed on an outer peripheral surface of the spring collet 27 at its tip, are brought into contact with each other to contract a tip of the spring collet 27, thereby chucking a cylindrical outer peripheral surface of the outer member 1.

In the spring collet 27, a support ring 35 and a positioning member 36 are mounted. The support ring 35 has a plurality of legs 37. Each leg 37 is fixed to an end plate of the collet holder 26 by screws.

The positioning member 36 is provided with a plurality of positioning pieces 36b on an outer periphery of an annular plate 36a fixed to the support ring 35 by screws. Each positioning piece 36b is inserted into an axial groove 38 formed in an inner periphery of the spring collet 27, and has its tip protruding outwardly from a tip of the spring collet 27.

The wheel bearing assembly A shown in FIG. 3 has a brake rotor 13 mounted by tightening nuts 14 in threaded engagement with hub bolts 8 with a predetermined torque. A vehicle body mounting surface 4a of a vehicle body-mounting flange 4 of the wheel bearing assembly A is a reference surface 4a. By pressing the reference surface 4a against tips of the positioning pieces 36b of the positioning member 36, the wheel bearing assembly A with a brake rotor is positioned.

In the support member 21 and the connecting shaft 28c of the drawbar 28, an air supply passage 39 is formed so as to communicate with an interior of the spring collet 27. When compressed air is supplied into the spring collet 27 through the air supply passage 39, the air flows along an outer peripheral surface of the outer member 1 clamped by the spring collet 27, and flows out through opposed surfaces of the spring collet 27 and a wheel-mounting flange 6.

As shown in FIG. 1, the first pressing device 24 has a joint member 41 connected to a piston rod 40a of a cylinder 40, and a pushrod 43 having its rear end rotatably supported by a bearing 42 mounted in the joint member 41. The pushrod 43 is moved back and forth by the cylinder 40 to press the raceway member 2b of the wheel bearing assembly A when advancing.

The second pressing device 25 has a support tube 45 slidably inserted in a guide hole 44 formed in the second support member 22, a support plate 46 having one end fixed to a rear end of the support tube 45 and another end supported so as to be slidable along a guide shaft 47 provided on the second support member 22, and a cylinder 48 fixed to the support plate 46 and having a piston rod 48a fixed to the second support member 22 to move the support tube 45 back and forth by the cylinder 48.

Also, a bearing 49 is mounted in the support tube 45 as shown in FIG. 2 to rotatably support a pushrod 50 so as to move back and forth together with the support tube 45. While advancing, the pushrod 50 axially presses, by its tip, an end face of a wheel pilot 9 formed on the hub ring 2a of the wheel bearing assembly A.

A pushing force with which the pushrod 43 of the first pressing device 24 and the pushrod 50 of the second pressing device 25 axially press the raceway member 2b and the hub ring 2a, respectively, is preset at a force which is substantially equal to a clamping force for clamping the raceway member 2b and the hub ring 2a when the wheel bearing assembly A is in an actually mounted state.

At the tip of the pushrod 50 in the second pressing device 25, a rotor pressing device 51 is provided to axially press the brake rotor 13 mounted to the wheel-mounting flange 6 of the inner member 2 of the wheel bearing assembly A. The rotor pressing device 51 has a pressing member 52 slidably fitted on the tip of the pushrod 50, a key 53 mounted on the pushrod 50 to prevent the pressing member 52 from rotating, a snap ring 54 and a stopper plate 55 mounted to the tip of the pushrod 50 for restricting an amount of sliding motion of the pressing member 52. The stopper plate 55 is axially position-adjustable by a nut 57 in threaded engagement with male threads 56 formed on an outer periphery of the pushrod 50.

Also, an axial hole 58 is formed in the pressing member 52, and a pin 59 and a spring 60 for biasing the pin 59 toward the stopper plate 55 are mounted in the hole 58. While the pushrod 50 is advancing, the pressing member 52 is advanced together with the pushrod 50 to bring the pressing member into abutment with the brake rotor 13. Further advancement of the pushrod 50 relative to the pressing member 52, which is now retained in a stopped state, causes the stopper plate 55 to push the pin 59 which deforms the spring 60, thereby pressing the brake rotor 13 via resilience of the spring 60.

The inner member 2, which is now pressed from both axial ends by the pushrods 43 and 50 of the first pressing device 24 and the second pressing device 25, is rotated by a rotary device 61 provided on the side of the second support member 22, as shown in FIG. 1.

As shown in FIGS. 1 and 2, the rotary device 61 comprises a motor 62 connected to a rear end of the pushrod 50 in the second pressing device 25, and a spline shaft 63 mounted to the tip of the pushrod 50 so as to be engageable in a spline hole 11 of the hub ring 2a of the wheel bearing assembly A. The spline shaft 63 is inserted into the spline hole 11 while the pushrod 50 is advancing so that the pushrod 50 will be rotated by the motor 62.

FIG. 1 shows a state in which the wheel bearing assembly A has been mounted. A tool rest 64 is provided on one side of an outer periphery of the brake rotor 13.

The tool rest 64 is movable parallel to the reference surface 4a formed on the vehicle body-mounting flange 4 of the outer member 1. On the tool rest 64, a cutting tool 65 for cutting braking-surfaces 13a on both sides of the brake rotor 13 is supported.

The cutting tool 65 comprises a pair of tool holders 67a and 67b having cutters 66 mounted at their tips. Tool holder 67a is fixed to a base 68 mounted to one side of the tool rest 64, while tool holder 67b is supported on a slider 71 which is movable along a slide base 70 of a linear slide 69, and arranged opposite to fixed tool holder 67a.

The slide base 70 is fixed to a support plate 72 mounted to one side of the tool rest 64. The slider 71 is moved along the slide base 70 as a threaded shaft 74a of a ball screw 74 is rotatably driven by a motor 73. By movement of the slider 71, a distance between the cutters 66 is adjustable.

The cutting device embodying the present invention has the above-described structure. In cutting the braking surfaces of the brake rotor 13 of the wheel bearing assembly A shown in FIG. 3, the outer member 1 of the wheel bearing assembly is inserted into the spring collet 27 of the chuck device 23 shown in FIG. 2, and the reference surface 4a formed on the vehicle body-mounting flange 4 is brought into abutment with tips of the positioning pieces 36b of the positioning member 36 to position the outer member 1.

After positioning the outer member 1, the drawbar 28 is retracted (leftwardly in FIG. 2) to contract the spring collet 27 by movement of the tapered surface of the spring collet 27 relative to the tapered surface 33 of the collet holder 26, thereby clamping the cylindrical outer peripheral surface of the outer member 1.

After clamping the outer member 1, the pushrods 43 and 50 of the first pressing device 24 and second pressing device 25 are advanced to press an end face of the raceway member 2b with the pushrod 43 of the first pressing device 24, and press the wheel pilot 9 of the hub ring 2a with the pushrod 50 of the second pressing device 25, thereby clamping the hub ring 2a and the raceway member 2b with a pressing force which is substantially equal to the clamping force in the actual mounted state.

While the pushrod 50 of the second pressing device 25 is advancing, the spline shaft 63 provided at the tip of the pushrod 50 is inserted into the spline hole 11 formed in the hub ring 2a.

Before the tip of the pushrod 50 presses the end face of the wheel pilot 9, the pressing member 52 provided at the tip of the pushrod 50 abuts a side of the brake rotor 13 and stops. As the pushrod 50 further advances relative to the pressing member 52, which is retained in a stopped state, the spring 60 will be resiliently deformed. Due to restoring resilience of the spring 60, the pressing member 52 presses one side of the brake rotor 13.

After the wheel bearing assembly with the brake rotor has been brought into the actual mounting state in this way, the pushrod 50 is rotated by actuating the motor 62 of the rotary device 61 and rotation is transmitted through the spline shaft 63 to the hub ring 2a to rotate the brake rotor 13.

During rotation of the brake rotor 13, by moving the tool rest 64 parallel to the reference surface 4a of the vehicle body mounting flange 4, the braking surfaces 13a of the brake rotor 13 are cut with the cutters 66 of the cutting tool 65, of which a distance between the cutters has been adjusted beforehand.

As described above, by cutting the braking surfaces 13a of the brake rotor 13 with the wheel bearing assembly A supported in the actual mounted state, and with the tool rest 64 carrying the cutting tool 65 positioned parallel to the reference surface 4a formed on the vehicle body mounting flange 4, accumulated errors, in which manufacturing errors of parts forming the wheel bearing assembly A have been accumulated, strains produced in the brake rotor 13 when mounting the brake rotor, and the like are removed. Thus, it is possible to finish the braking surfaces 13a to predetermined surfaces.

Cutting of the braking surfaces 13a should be by dry-cutting using no cutting oil. By supplying compressed air into the air supply passage 39 during cutting, the compressed air will flow along the outer peripheral surface of the outer member 1 and flow out from the opposed surfaces of the spring collet 27 and the wheel-mounting flange 6. This prevents occurance of trouble in which chips produced by cutting adhere to seals S of the wheel bearing assembly and causes damage thereto.

Also, as shown by a chain line in FIG. 2, suction nozzles 75 are provided around the cutters 66 of the tool holders 67a and 67b, and suction force is applied to the suction nozzles 75 to suck chips. This also prevents chips from adhering to the seals S of the wheel bearing assembly A, so as to prevent damage to the seals.

After cutting of the braking surfaces 13a of the brake rotor 13, the slider 71 of the linear slide 69 is retracted to retract the tool holder 67b supported on the slider 71 relative to the fixed tool holder 67a. The tool rest 64 is then retracted.

After retraction of the tool rest 64, the pushrods 43 and 50 of the first pressing device 24 and the second pressing device 25 retract to release clamping of the inner member 2 from both sides and pressing of the brake rotor 13 by the pressing member 52. The wheel bearing assembly A with the brake rotor is removed from the cutting device.

In the embodiment shown in FIG. 2, description has been made taking the wheel bearing assembly A with the brake rotor shown in FIG. 3 as an example. But a wheel bearing assembly A with a brake rotor is not limited thereto. A wheel bearing assembly A for a non-driving wheel as shown in FIG. 4 may be employed.

Figure 4:
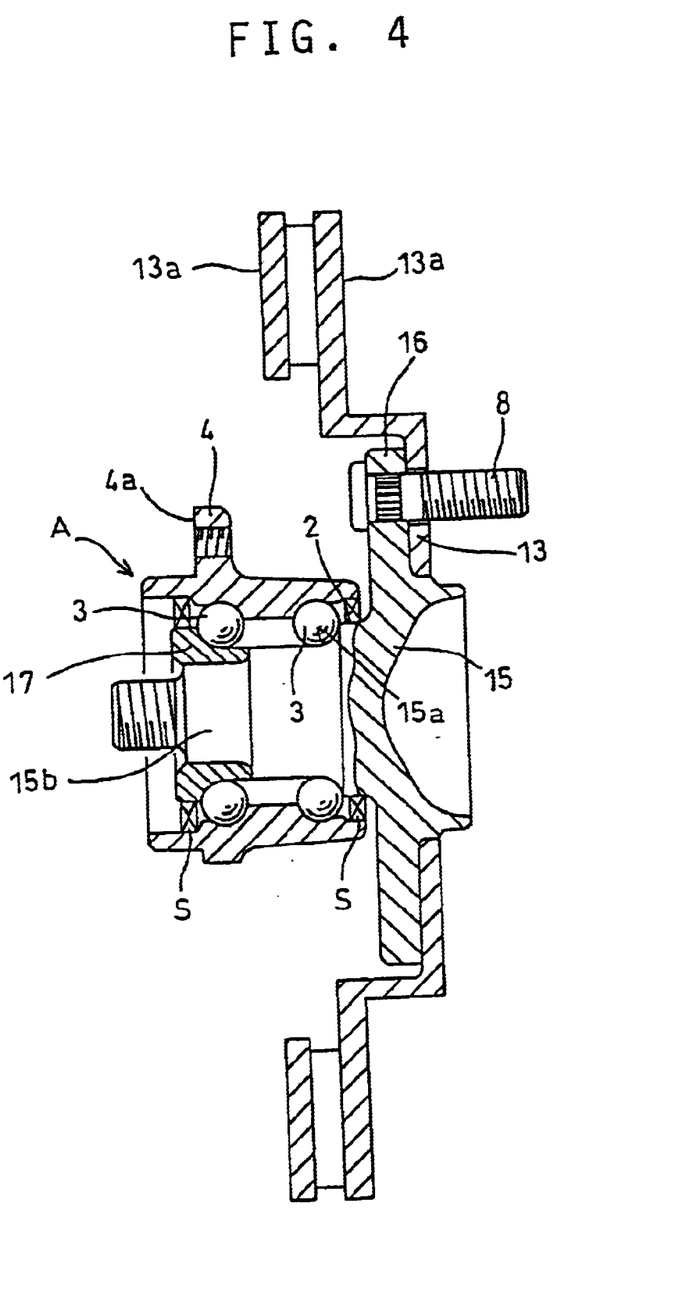
FIG. 4 is a similar view showing another example of a wheel bearing assembly.

The wheel bearing assembly A shown in FIG. 4 differs from the one shown in FIG. 3 in that inner member 2 comprises an axle 15 as a first rotary member having a wheel-mounting flange 16 and a raceway 15a on its outer periphery, and a raceway member 17 as a second rotary member mounted on a small-diameter portion 15b of the axle 15. For the same parts as those of the wheel bearing assembly A shown in FIG. 3, the same symbols are used and their description is omitted.

Figure 5:
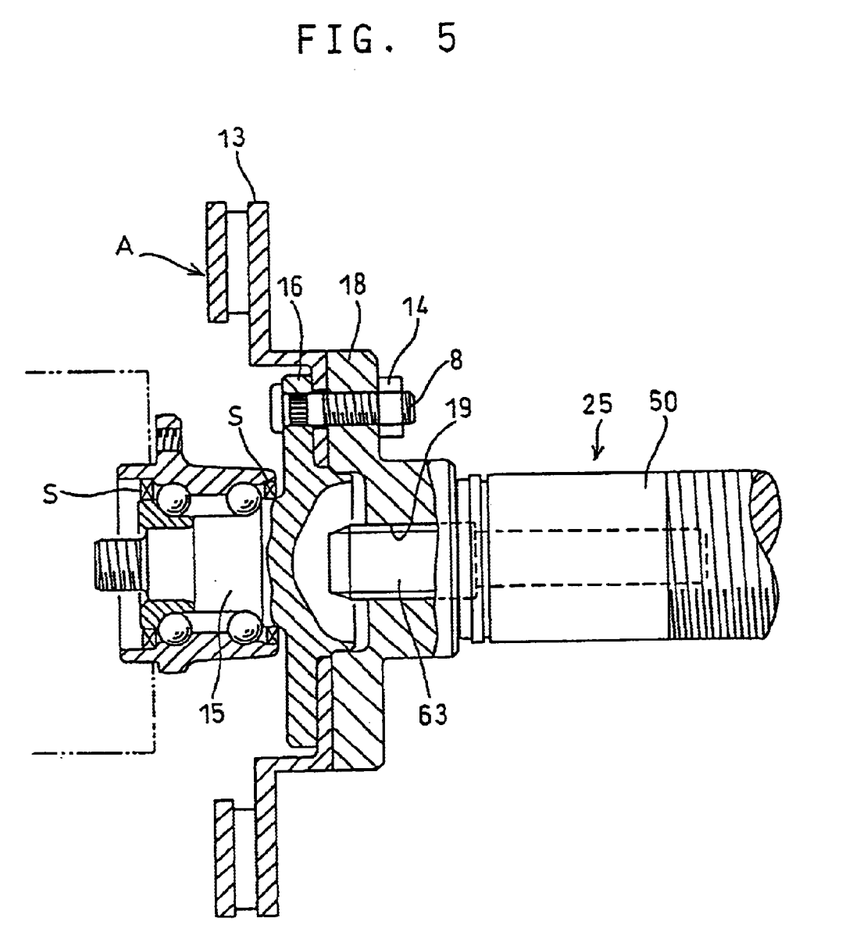
FIG. 5 is a sectional view of an attachment for driving the wheel bearing assembly shown in FIG. 4.

In preparation for cutting of the braking surfaces 13a of the brake rotor 13 which is to be mounted to the wheel bearing assembly A, as shown in FIG. 5, the brake rotor 13 and a flange 18 having a spline hole 19 are superposed on the wheel-mounting flange 16 provided on the axle 15. Nuts 14 are brought into threaded engagement with hub bolts 8 provided on the wheel-mounting flange 16, and the nuts 14 are tightened with a predetermined torque to assemble the wheel bearing assembly A with the brake rotor in an actual mounting state.

In the cutting device shown in FIG. 2, the pressing member 52 supported on the tip of the pushrod 50 of the second pressing device 25 is removed beforehand. For rotation of the brake rotor 13 to cut the braking surfaces 13a, while the pushrod 50 presses the flange 18, the spline shaft 63 at the tip of the pushrod 50 is inserted into spline hole 19 of the flange 18 to transmit rotation of the pushrod 50 through the spline shaft 63 to the flange 18, thereby rotating the inner member 2 and the brake rotor 13.

As described above, according to this invention, by clamping, with a chuck device, a cylindrical outer peripheral surface of an outer member positioned by a positioning member and advancing pushrods of two oppositely arranged pressing devices, a wheel bearing assembly with a brake rotor can be retained in an actual mounted state. Also, the wheel bearing assembly can be removed from a cutting device by retracting the pushrods of the pressing devices and releasing the clamping by the chuck device. Thus, the wheel bearing assembly with the brake rotor can be attached and detached easily to and from the cutting device. Thus, cutting of braking surfaces of the brake rotor can be carried out efficiently

What is claimed is:

1. A cutting device for cutting braking surfaces of a brake rotor mounted on a wheel bearing assembly, the wheel bearing assembly including
   (i) an outer member having a vehicle body-mounting flange on an outer periphery of the outer member, the vehicle body-mounting flange having a mounting surface that is to be mounted to a vehicle body and is to serve as a reference surface during cutting of the braking surfaces of the brake rotor,
   (ii) an inner member having a wheel-mounting flange on an outer periphery of the inner member, and
   (iii) rolling elements between the inner member and the outer member, said cutting device comprising:
   a positioning member for positioning the mounting surface of the vehicle body-mounting flange;
   a chuck device for clamping the outer member;
   a pressing device including
      (a) a first pushrod and a second pushrod aligned with each other on a common axis so as to be rotatable about said common axis and movable along said common axis,
      (b) a first actuator for driving and moving said first pushrod along said common axis toward said second pushrod until said first pushrod abuts one end of the inner member of the wheel bearing assembly,
      (c) a second actuator for driving and moving said second pushrod along said common axis toward said first pushrod until said second pushrod abuts another end of the inner member of the wheel bearing assembly so as to clamp the inner member with a predetermined force between said first and second pushrods when said first pushrod abuts the one end of the inner member and said second pushrod abuts the another end of the inner member, and (d) a rotary drive unit for rotating one of said first and second pushrods while the inner member is clamped between said first and second pushrods; and a tool rest carrying a cutting tool for cutting the braking surfaces of the brake rotor, said tool rest being movable in a direction parallel to the mounting surface of the vehicle body-mounting flange.

2. The cutting device according to claim 1, wherein said cutting tool includes
   (i) a first tool holder carrying a cutter for cutting a braking surface on one side of the brake rotor, with said first tool holder being fixed to said tool rest, and
   (ii) a second tool holder carrying a cutter for cutting a braking surface on an opposite side of the brake rotor, with said second tool holder being movable relative to said first tool holder.

3. The cutting device according to claim 2, further comprising:
   an air supply device for supplying compressed air from one end of the outer member of the wheel bearing assembly along an outer peripheral surface of the outer member.

4. The cutting device according to claim 3, further comprising:
   a suction device for sucking and removing chips formed by cutting the braking surfaces of the brake rotor.

5. The cutting device according to claim 2, further comprising:
   a suction device for sucking and removing chips formed by cutting the braking surfaces of the brake rotor.

6. The cutting device according to claim 1, further comprising:
   an air supply device for supplying compressed air from one end of the outer member of the wheel bearing assembly along an outer peripheral surface of the outer member.

7. The cutting device according to claim 6, further comprising:
   a suction device for sucking and removing chips formed by cutting the braking surfaces of the brake rotor.

8. The cutting device according to claim 1, further comprising:
   a suction device for sucking and removing chips formed by cutting the braking surfaces of the brake rotor.

9. The cutting device according to claim 1, wherein said first actuator comprises a first cylinder, and said second actuator comprises a second cylinder.

10. The cutting device according to claim 9, wherein said cutting tool includes
    (i) a first tool holder carrying a cutter for cutting a braking surface on one side of the brake rotor, with said first tool holder being fixed to said tool rest, and
    (ii) a second tool holder carrying a cutter for cutting a braking surface on an opposite side of the brake rotor, with said second tool holder being movable relative to said first tool holder.

11. The cutting device according to claim 9, further comprising:
    an air supply device for supplying compressed air from one end of the outer member of the wheel bearing assembly along an outer peripheral surface of the outer member.

12. The cutting device according to claim 9, further comprising:
    a suction device for sucking and removing chips formed by cutting the braking surfaces of the brake rotor.

13. The cutting device according to claim 1, wherein said first actuator comprises a first piston-cylinder arrangement, and said second actuator comprises a second piston-cylinder arrangement.

14. The cutting device according to claim 13, wherein said cutting tool includes
    (i) a first tool holder carrying a cutter for cutting a braking surface on one side of the brake rotor, with said first tool holder being fixed to said tool rest, and
    (ii) a second tool holder carrying a cutter for cutting a braking surface on an opposite side of the brake rotor, with said second tool holder being movable relative to said first tool holder.

15. The cutting device according to claim 13, further comprising:
    an air supply device for supplying compressed air from one end of the outer member of the wheel bearing assembly along an outer peripheral surface of the outer member.

16. The cutting device according to claim 13, further comprising:
    a suction device for sucking and removing chips formed by cutting the braking surfaces of the brake rotor.

17. The cutting device according to claim 1, wherein said first actuator is for driving and moving said first pushrod independently of said second actuator driving and moving said second pushrod.

18. The cutting device according to claim 17, wherein said cutting tool includes
    (i) a first tool holder carrying a cutter for cutting a braking surface on one side of the brake rotor, with said first tool holder being fixed to said tool rest, and
    (ii) a second tool holder carrying a cutter for cutting a braking surface on an opposite side of the brake rotor, with said second tool holder being movable relative to said first tool holder.

19. The cutting device according to claim 17, further comprising:
    an air supply device for supplying compressed air from one end of the outer member of the wheel bearing assembly along an outer peripheral surface of the outer member.

20. The cutting device according to claim 17, further comprising:
    a suction device for sucking and removing chips formed by cutting the braking surfaces of the brake rotor.

* * * * *